United States Patent
Kim

(10) Patent No.: US 10,152,028 B2
(45) Date of Patent: Dec. 11, 2018

(54) WRISTWATCH TYPE SMART TERMINAL

(71) Applicant: Jung Young Kim, Ulsan (KR)

(72) Inventor: Jung Young Kim, Ulsan (KR)

( * ) Notice: Subject to any disclaimer, the term of this patent is extended or adjusted under 35 U.S.C. 154(b) by 12 days.

(21) Appl. No.: 15/116,559

(22) PCT Filed: Feb. 26, 2015

(86) PCT No.: PCT/KR2015/001885
§ 371 (c)(1),
(2) Date: Aug. 4, 2016

(87) PCT Pub. No.: WO2015/147450
PCT Pub. Date: Oct. 1, 2015

(65) Prior Publication Data
US 2016/0357158 A1    Dec. 8, 2016

(30) Foreign Application Priority Data
Oct. 6, 2014 (KR) .................... 10-2014-0134226

(51) Int. Cl.
*G04G 17/04*    (2006.01)
*G04G 21/08*    (2010.01)
(Continued)

(52) U.S. Cl.
CPC .......... *G04G 17/045* (2013.01); *G04G 21/06* (2013.01); *G04G 21/08* (2013.01); *G06F 1/163* (2013.01); *G06F 1/1652* (2013.01)

(58) Field of Classification Search
CPC .......... A45F 2003/006; A45F 2005/008; A45F 2200/0516; G06F 1/1652; Y10T 403/32073; Y10T 43/32057
(Continued)

(56) References Cited

U.S. PATENT DOCUMENTS 6,647,248 B1 * 11/2003 Ortscheid ........... B60R 11/0241
                                                          224/255
6,696,986 B1 * 2/2004 Harrison, Jr. ........... G06F 1/163
                                                          224/219
(Continued)

FOREIGN PATENT DOCUMENTS

JP    2001-103536 A    4/2001
JP    2002-271466 A    9/2002
(Continued)

*Primary Examiner* — Adam Waggenspack
(74) *Attorney, Agent, or Firm* — STIP Law Group, LLC

(57) ABSTRACT

Disclosed is a wristwatch type smart terminal. The wristwatch type smart terminal includes a display and a band for accommodating the display, and implements a wide display for displaying information and enabling a user to watch a movie or DMB, and enables the display to be accommodated in the wrist band such that the display can be worn on the wrist of the user when stored, thereby enabling the wristwatch type smart terminal to be conveniently used and carried. Furthermore, the wristwatch type smart terminal enables the display to slide or rotate on the fixing band as an axis according to the convenience, use, and purpose of the user so as to simply adjust the use position and angle, thereby preventing inconvenience of use even when the wrist type smart terminal is used in a limited space such as on the wrist.

19 Claims, 18 Drawing Sheets

(51) Int. Cl.
*G06F 1/16* (2006.01)
*G04G 21/06* (2010.01)

(58) Field of Classification Search
USPC .............................. 224/930, 219, 267, 222
See application file for complete search history.

(56) References Cited

U.S. PATENT DOCUMENTS

| | | | | |
|---|---|---|---|---|
| 6,707,764 | B2 * | 3/2004 | Davidson | H04B 1/385 |
| | | | | 368/13 |
| 6,882,870 | B2 * | 4/2005 | Kivela | H04B 1/38 |
| | | | | 455/41.2 |
| 7,558,057 | B1 * | 7/2009 | Naksen | G06F 1/1613 |
| | | | | 361/679.3 |
| 8,328,055 | B1 * | 12/2012 | Snyder | A45F 5/00 |
| | | | | 224/197 |
| 8,654,519 | B2 * | 2/2014 | Visser | G09F 9/00 |
| | | | | 361/679.21 |
| D721,701 | S * | 1/2015 | Al-Nasser | D14/344 |
| D726,140 | S * | 4/2015 | Park | D14/138 R |
| 9,513,665 | B2 * | 12/2016 | Magi | G06F 1/163 |
| 2003/0071791 | A1 * | 4/2003 | Hanson | G06F 1/1601 |
| | | | | 345/169 |
| 2007/0042821 | A1 * | 2/2007 | Lee | H04B 1/385 |
| | | | | 455/575.6 |
| 2009/0219788 | A1 * | 9/2009 | Henley, Jr. | G04G 17/083 |
| | | | | 368/13 |
| 2013/0250738 | A1 * | 9/2013 | Kim | G04G 17/08 |
| | | | | 368/29 |

FOREIGN PATENT DOCUMENTS

| | | |
|---|---|---|
| KR | 10-2000-0057682 A | 9/2000 |
| KR | 20-0365972 Y1 | 10/2004 |
| KR | 10-0642310 B1 | 11/2006 |

* cited by examiner

【Figure 1】
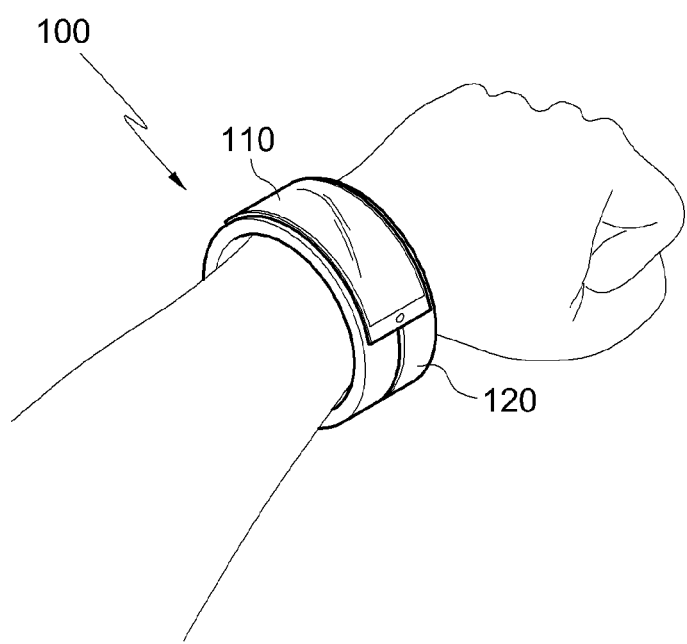

[Figure 2]
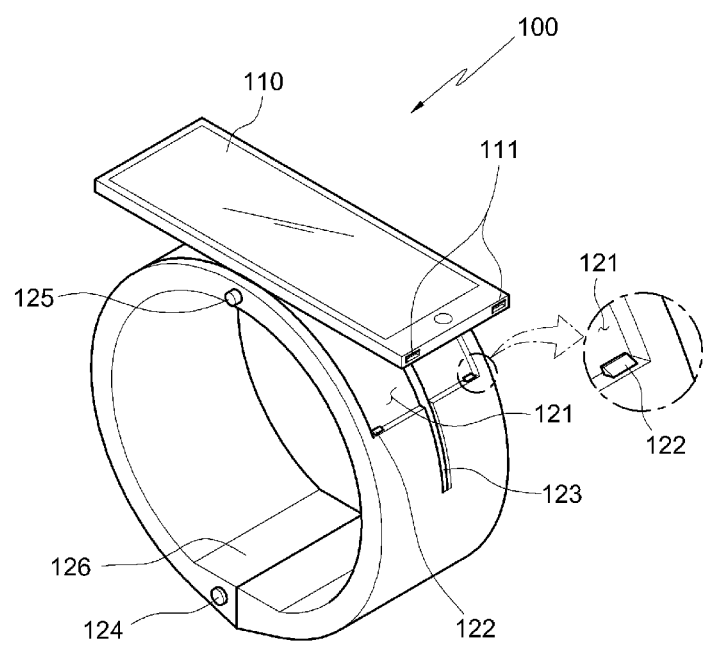

[Figure 3]
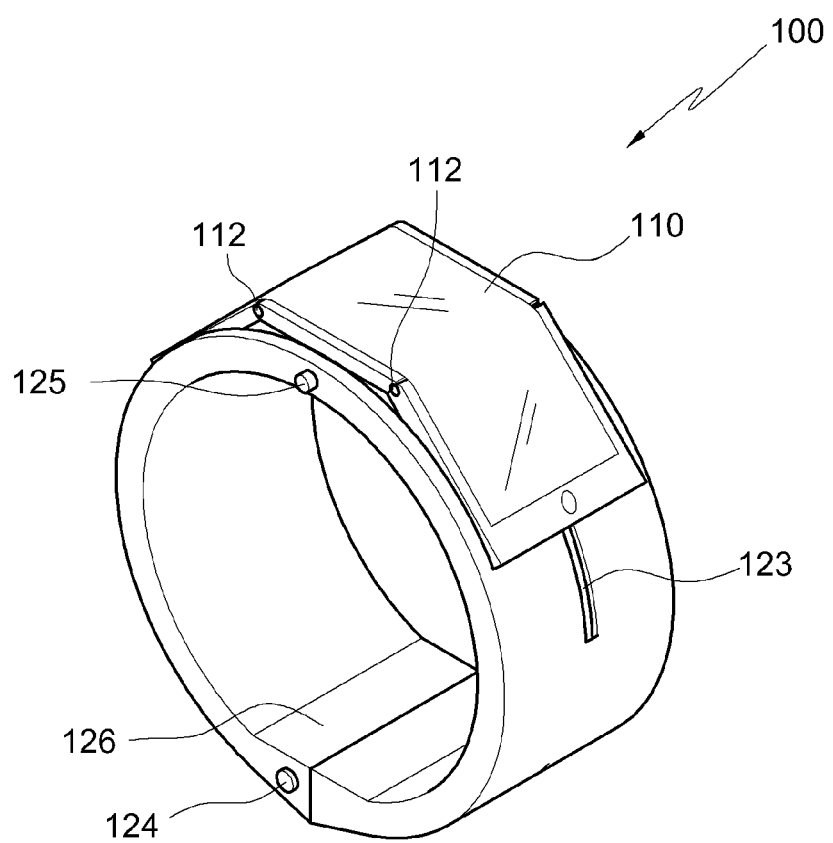

【Figure 4】
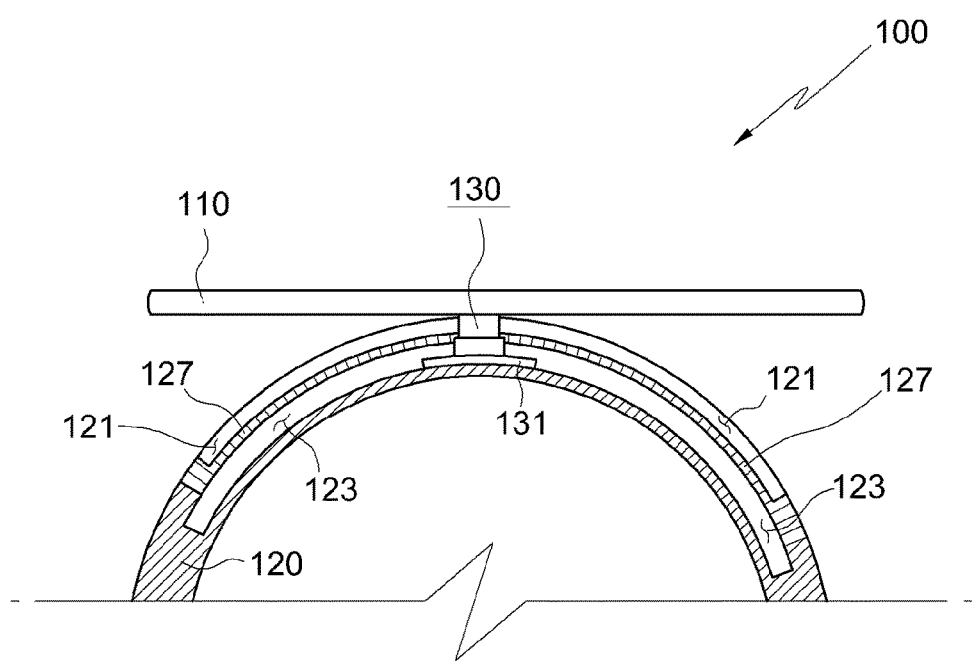

【Figure 5】
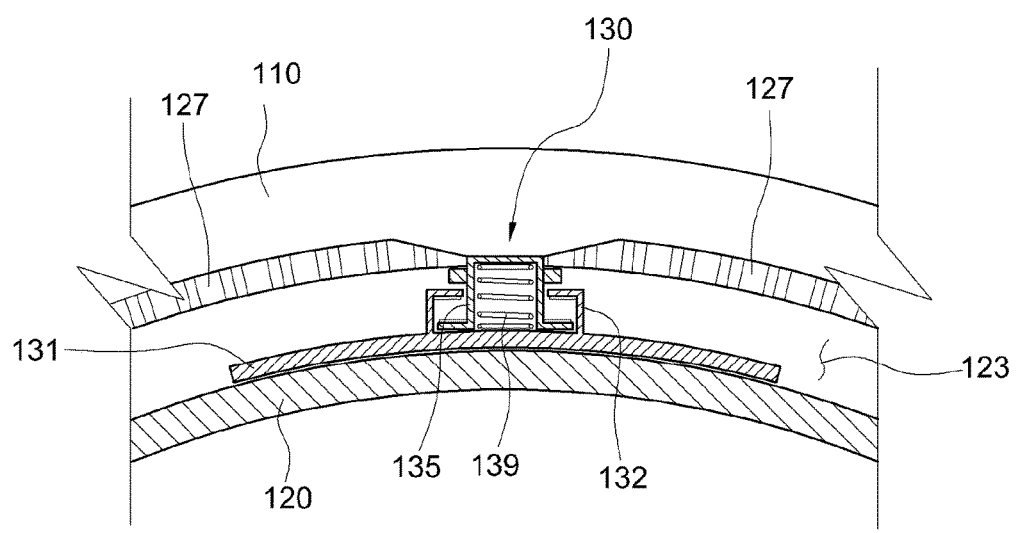

[Figure 6]
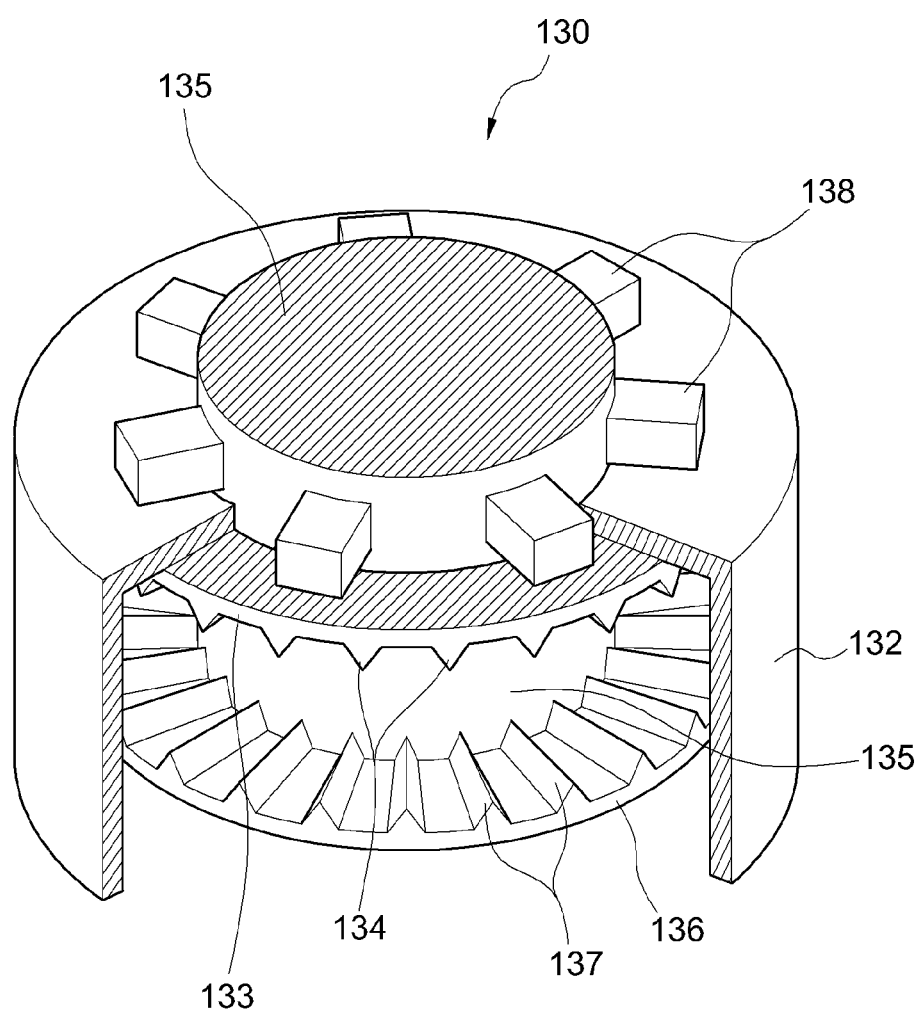

[Figure 7]
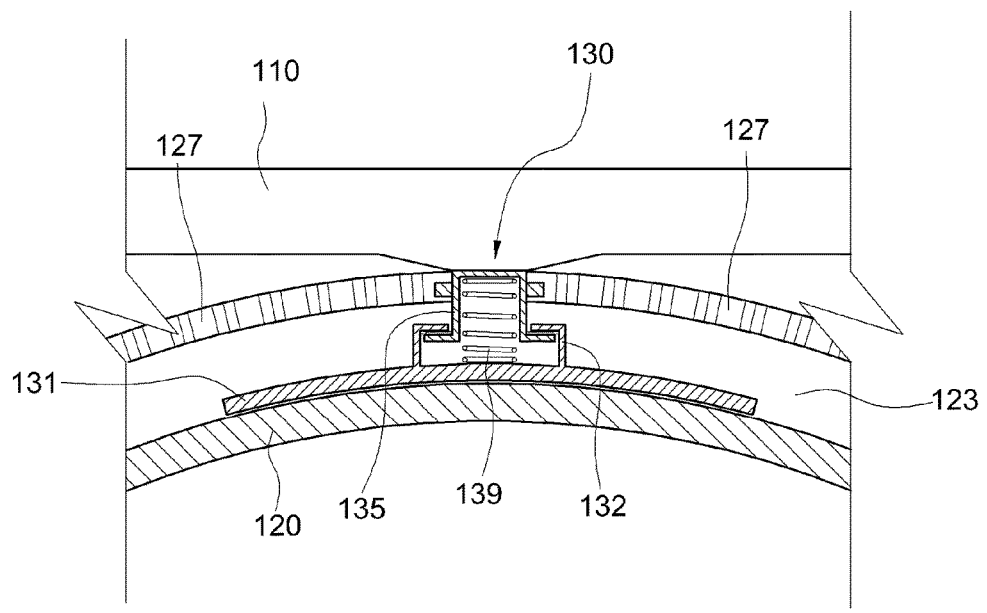

【Figure 8】
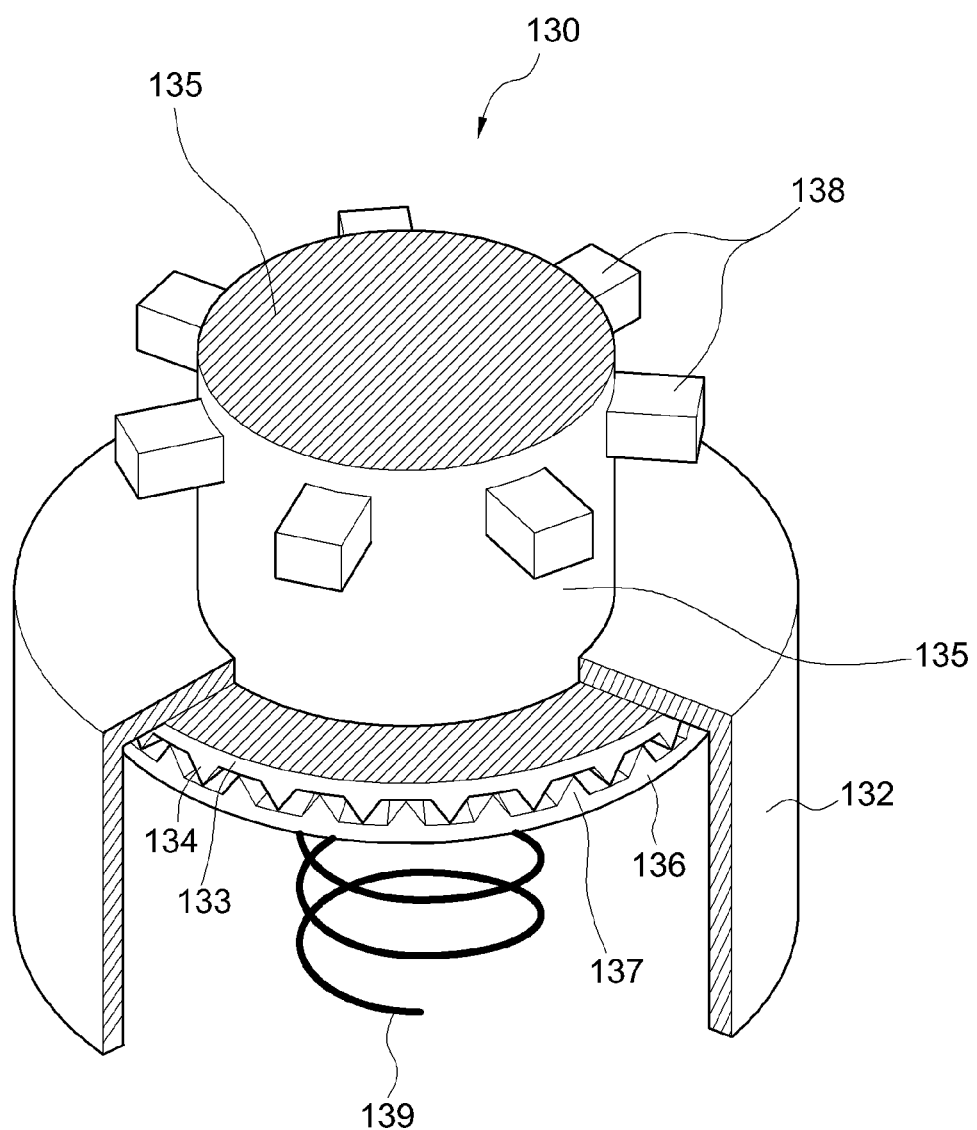

【Figure 9】
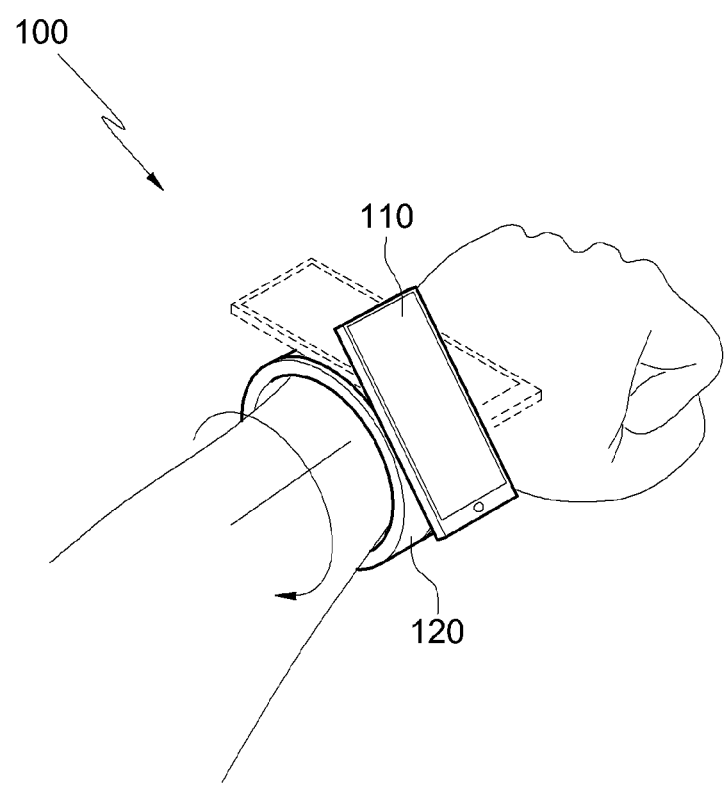

[Figure 10]
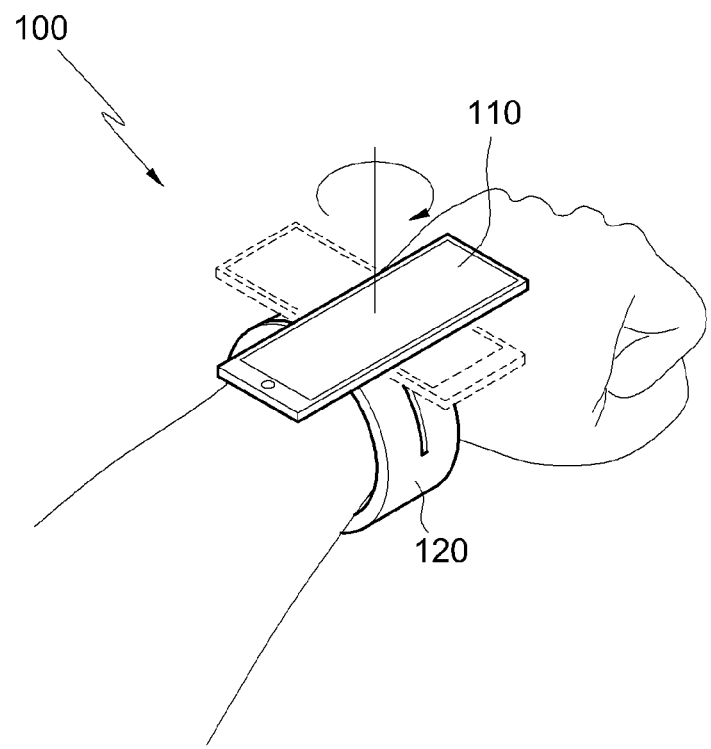

【Figure 11】
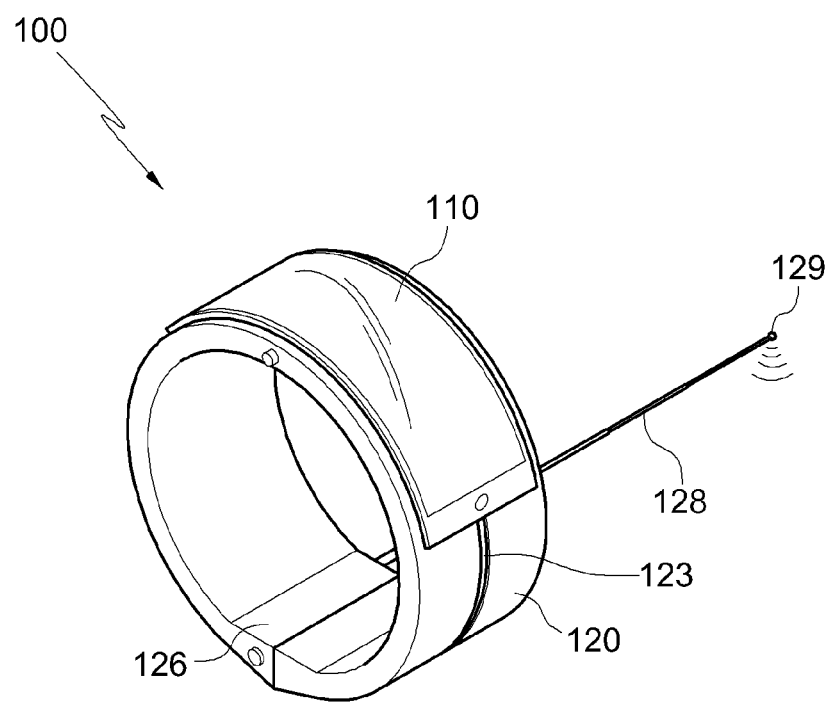

【Figure 12】
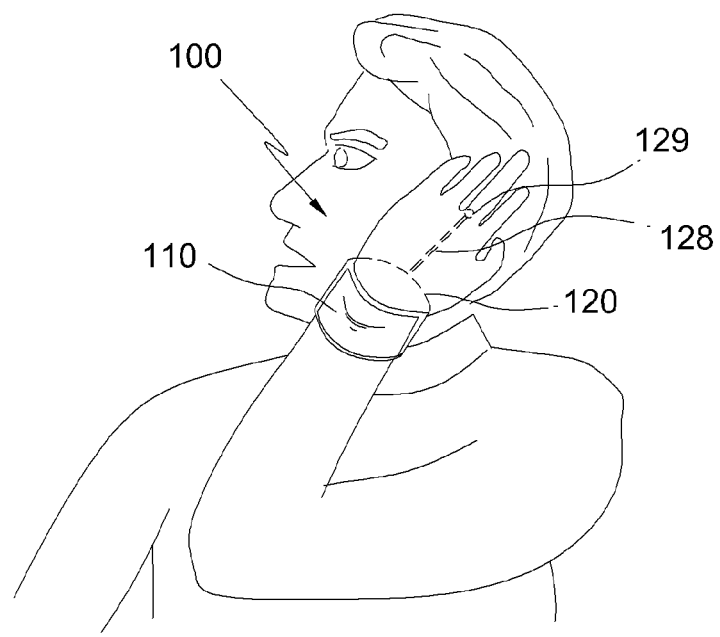

【Figure 13】
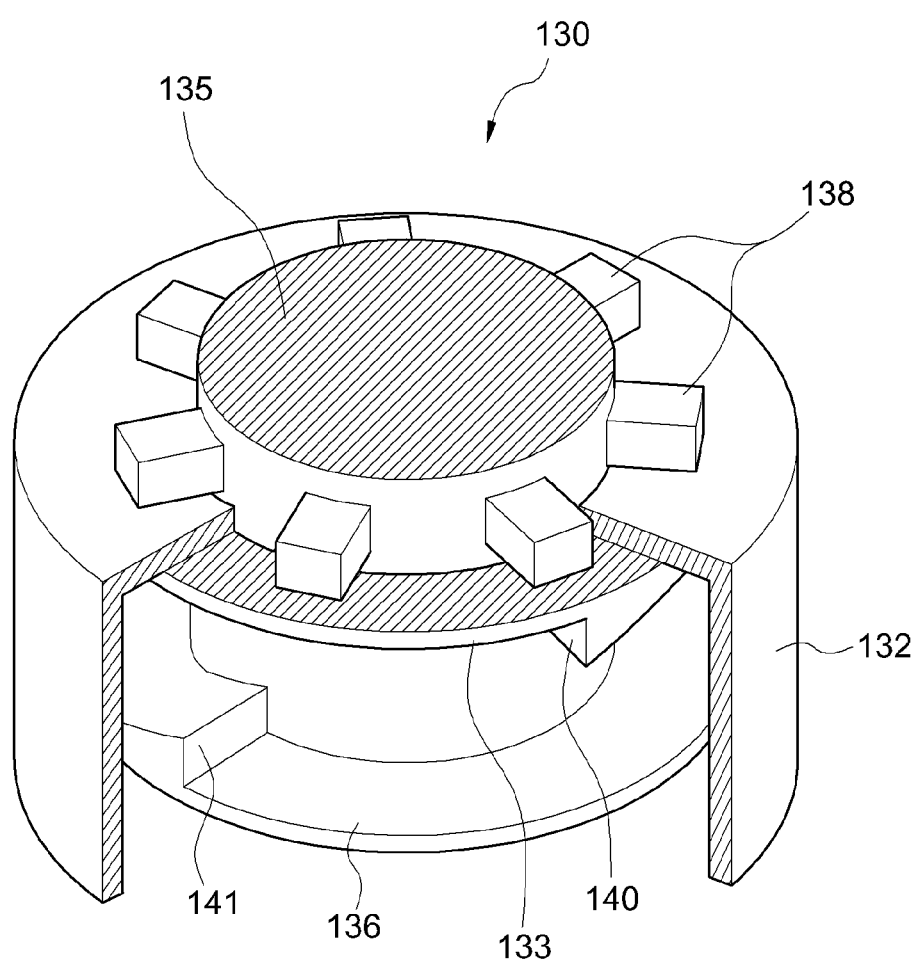

【Figure 14】
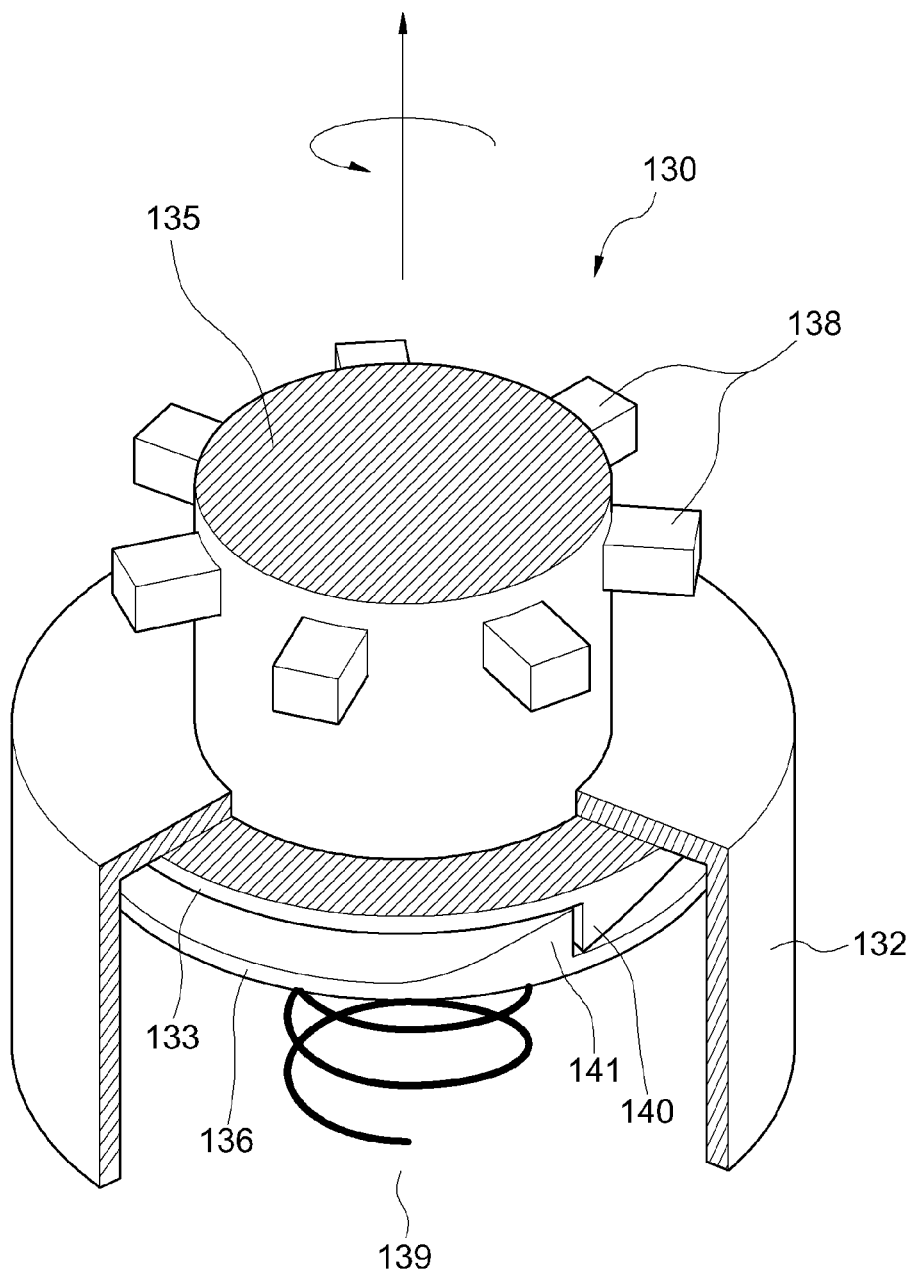

【Figure 15】
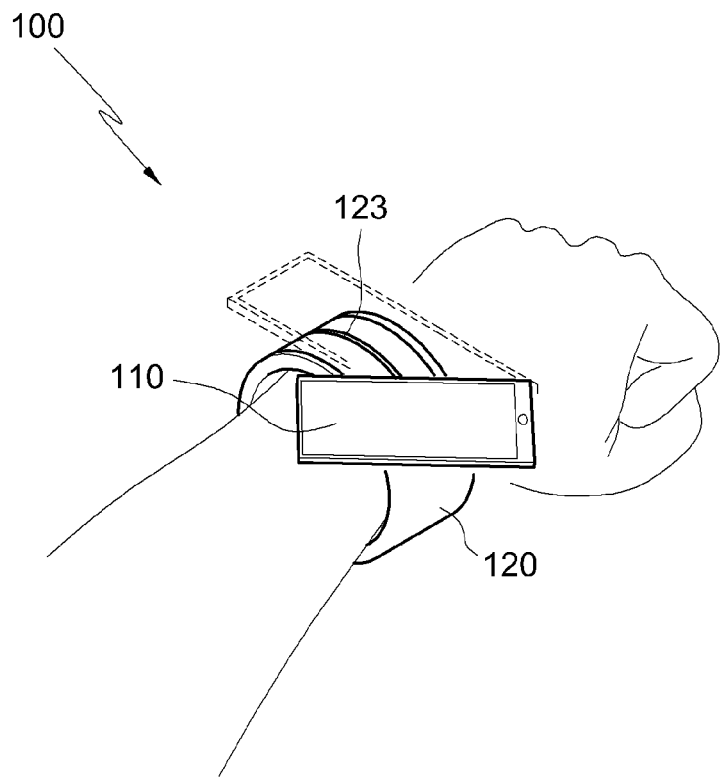

【Figure 16】
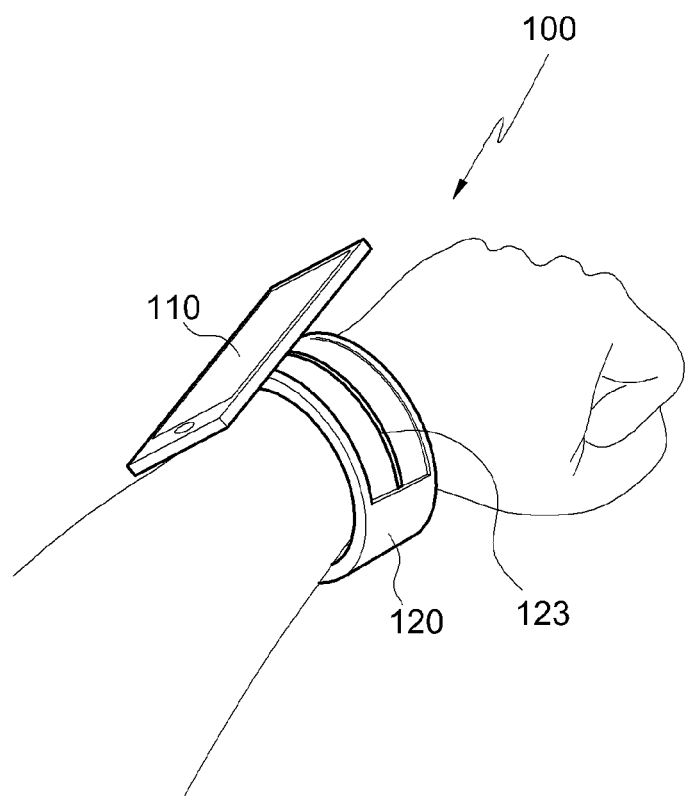

【Figure 17】
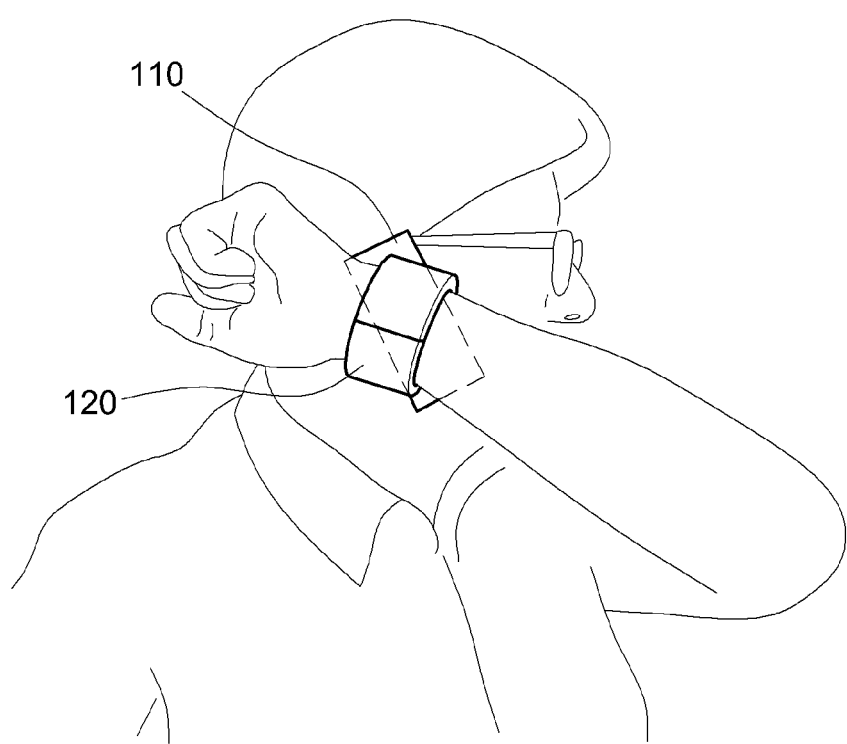

[Figure 18]
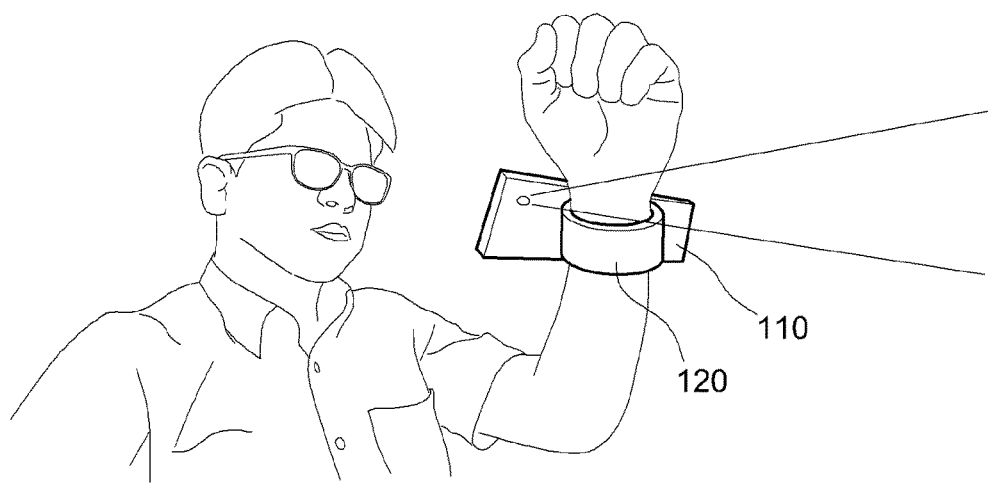

WRISTWATCH TYPE SMART TERMINAL

CROSS-REFERENCE TO PRIOR APPLICATIONS

This application is a national Stage Patent Application of PCT International Patent Application No. PCT/KR2015/001885, filed on Feb. 26, 2015 under 35 U.S.C. § 371, which claims priority of Korean Patent Application Nos. 10-2014-0034035,filed on Mar. 24, 2014, and 10-2014-0134226, filed on Oct. 6, 2014, which are all hereby incorporated by reference in their entirety.

TECHNICAL FIELD

The following disclosure relates to a smart terminal that can be worn on the wrist line a watch, and in particular, to a wristwatch type smart terminal easy to independently use all functions of a smart phone without being dependent on an existing smart phone.

BACKGROUND ART

A smartphone is being widely used as a typical smart terminal.

A smartphone is a typical smart terminal capable of performing message transmission/reception, voice and video calls, listening to music, watching movies, and communication of various kinds of data. Recently, larger Liquid Crystal Displays (LCDs) are being preferred.

Since such a large smartphone is hard to carry in a pocket, a user carries the smartphone in his/her hand or bag. Accordingly, a large smartphone is very inconvenient to carry and very easy to lose. Also, a large smartphone may be dropped and damaged during use.

Also, when a smartphone is carried in a pocket or bag, it is very difficult for a user to recognize a phone call or message arrival.

In order to overcome these limitations, smart watches which are worn on the wrist to show the time for a user and are connected to a smartphone in a bag or pocket via Bluetooth to inform a user when a phone call, a message, or an e-mail arrives are being developed and released on the market.

However, since the smart watches, which are devices worn on the wrist, have a limitation in size of LCD, they only show the time or inform a user of calling of a smartphone or reception of a message, and cannot provide functions such as information search, watching Digital Multimedia Broadcasting (DMB), or watching movies for a user.

In addition, since the smart watch is functionally dependent on the smartphone, the smartphone needs to be separately carried even though the smart watch is worn on the wrist.

DISCLOSURE

Technical Problem

Accordingly, the present disclosure provides a wristwatch type smart terminal, which can perform all functions of an independent smart terminal by a wide display and an interface device physically and optimally connecting parts of human body such as wrist, ear, and mouth used during a phone call such that the call posture of a user is conveniently and naturally maintained ergonomically even if transmitting/receiving parts of a smart terminal are accommodated and stored in a limited space of a wrist band, while being worn on the wrist to be conveniently carried without being carried in a pocket or a bag.

Technical Solution

In one general aspect, a wristwatch type smart terminal includes: a display (110) inputting or displaying data; a band (120) worn on a wrist of a user to fix the display (110) to the wrist of the user; a guide part (123) longitudinally formed in an outer surface of the band (120) and guiding a sliding movement of the display (110); and a display supporting unit (130) having an upper part coupled to an undersurface of the display (110) and a lower part coupled to a base (131) disposed inside the guide part (123) of the band (120), and moving the display (110) along the guide part (123) of the band (120) from the upper part to the lower part of the wrist.

In another general aspect, a wristwatch type smart terminal includes: a display (110) inputting or displaying data; a band (120) worn on a wrist of a user to fix the display (110) to the wrist of the user; and a display supporting unit (130) having an upper part coupled to an undersurface of the display (110) and a lower part coupled to a base (131) inside the band (120 to support the display (110), wherein: the band (120) includes a display seating part (121) having a recessed shape; the display (110), which is a flexible display, is inserted into and fixed to the display seating part (121) through a fixing member while being bent in the same curvature as a curvature of the band (120); and the fixing member includes: a display fixing protrusion (122) inwardly protruding from both side ends of the display seating part (121); a stopping groove (111) formed on both side ends of the display (110) to receive the display fixing protrusion (122); and a display unlock button (125) separating the display fixing protrusion (122) inserted into the stopping groove (111) of the display (110).

In another general aspect, a wristwatch type smart terminal includes: a display (110) inputting or displaying data; a band (120) worn on a wrist of a user to fix the display (110) to the wrist of the user; and a display supporting unit (130) having an upper part coupled to an undersurface of the display (110) and a lower part coupled to a base (131) inside the band (120 to support the display (110), wherein the band (120) includes a display seating part (121) having a recessed shape, and the display (110), which is a flexible display, is inserted into and fixed to the display seating part (121) through a fixing member while being bent at a certain angle through at least one elastic hinge (112) disposed on the undersurface of the display (110). The flexible display (110) disposed over the elastic hinge (112) may be bent while forming a gently curved surface as the elastic hinge (112) pivots.

The fixing member may include: a display fixing protrusion (122) inwardly protruding from both side ends of the display seating part (121); a stopping groove (111) formed in both side ends of the display (110) to receive the display fixing protrusion (122); and a display unlock button (125) separating the display fixing protrusion (122) inserted into the stopping groove (111) of the display (110).

The display supporting unit (130) may include: a first holder (132) having a cylindrical shape, having a lower portion thereof coupled to the base (131), and having a hole which is formed in an upper surface thereof and through which a second holder (135) rises and falls; the second holder (135) having an upper end thereof coupled to the display (110) and inserted into the first holder (132) to rise and fall through the hole formed in the upper surface of the first holder (132); a spring (139) disposed under the second holder (135) and supported by the first holder (132) to elastically support the second holder (135); and a fixing stopper (138) radially protruding at a certain interval from an outer surface of the second holder (135), wherein when the second holder (135) rises, the fixing stopper (138) of the second holder (135) is inserted into an insertion groove (127) continuously formed in an inner surface of the guide part (123) of the band (120) at a certain interval to constrain a movement of the display (110) coupled to the upper end of the second holder (135), and when the second holder (135) falls, the fixing stopper (138) of the second holder (135) is separated from the insertion groove (127) continuously formed in the left and right sides of the inner surface of the guide part (123) of the band (120) at a certain interval to release the movement constraint of the display (110) and thus allow the display (110) to slide along the guide part (123) of the band (120) and rotate.

The wristwatch type smart terminal may include: a second disk (136) including a second toothed gear (137) upwardly and radially protruding at a certain interval from an upper surface of a disk mounted on a lower outer circumference of the second holder (135); and a first disk (133) including a first toothed gear (134) downwardly and radially protruding at a certain interval from a lower surface of a disk mounted on an edge circumference inside an upper cover of the first holder (132), wherein when the second holder (135) rises, a rotation of the display (110) coupled to the second holder (135) is constrained by a mutual interference movement according to coupling of the first disk (133) and the second disk (136), and when the second holder (135) falls, the first disk (133) and the second disk (136) are decoupled to allow the display (110) coupled to the second holder (135) to rotate.

The band (120) may include: a rod storage part (126); and a rod (128) including an ear speaker (129) disposed at an end thereof, the rod being adjustable in length by being formed of multiple rods having different inner diameters and allowing one rod to be inserted into another adjacent rod, and the rod (128) may be stored in the rod storage part (126) and may be withdrawn from the rod storage part (126) to allow the ear speaker (129) to operate near an ear of a human body when a user takes a phone call.

The band (120) may include an automatic line winder disposed therein and allowing an earphone line connected to the ear speaker (129) to be wound at an end portion of the automatic line winder, and for a phone call, when the ear speaker (129) is withdrawn and worn on the ear, the earphone line wound inside the band (120) may be unwound, and when the phone call is finished and the ear speaker (129) is detached from the ear, the earphone line may be automatically wound inside the band (120).

The spring (139) disposed under the second holder (135) may have a lower end thereof coupled to the first holder (132) or the base (131) and an upper end thereof coupled to the second holder (135), and when second holder (135) rises, the second holder (135) may rise while rotating at a certain angle by a torsion of the spring (139) and thus may allow the display (110) coupled to the upper end of the second holder (135) to simultaneously rotate at the certain angle.

The wristwatch type smart terminal may include: a second disk (136) including a second stopper (141) upwardly protruding from an upper surface of a disk mounted on a lower outer circumference of the second holder (135); and a first disk (133) including a first stopper (140) downwardly protruding from a lower surface of a disk mounted on an edge circumference inside an upper cover of the first holder (132), wherein when the second holder (135) rises, the second holder (135) rises while rotating by the torsion of the spring (139) and thus constrains a rotation movement of the display (110) at an angular displacement due to coupling by a sliding rotation movement of the first stopper (140) of the first disk (133) and the second stopper (141) of the second disk (136).

The wristwatch type smart terminal may include a tensile force acting member having one side thereof coupled to the base (131) or the display supporting unit (130) and the other side thereof fixed to any one side of both side ends of the guide part (123), wherein when the second holder (135) rises, the display supporting unit (130) is configured to automatically slide along the guide part (123).

Other features and aspects will be apparent from the following detailed description, the drawings, and the claims.

Advantageous Effects

A wristwatch type smart terminal according to an embodiment of the present invention can be worn on the wrist of human body to be conveniently carried, and can independently perform all functions of a smartphone. Also, a phone call can be much more conveniently performed ergonomically than a user makes a phone call while typically holding a smart terminal by hand.

Furthermore, the wristwatch type smart terminal can display a large amount of information on a wide display screen like a typical smart terminal, and can provide a function such as watching movie or DMB. In addition, it is very convenient to carry and use the wristwatch type smart terminal by storing the display screen in a wrist band while being worn on the wrist.

DESCRIPTION OF DRAWINGS

FIG. 1 is a view illustrating a wristwatch type smart terminal worn on the wrist according to an embodiment of the present invention.

FIG. 2 is a view illustrating a spread state of a wristwatch type smart terminal according to an embodiment of the present invention.

FIG. 3 is a view illustrating a wristwatch type smart terminal according to another embodiment of the present invention.

FIG. 4 is a cross-sectional view illustrating a coupling structure of a display or a band.

FIG. 5 is a cross-sectional view illustrating a display stored in a band.

FIG. 6 is a partially sectional perspective view illustrating a display supporting unit when a display is stored in a band.

FIG. 7 is a cross-sectional view illustrating a display that is spread.

FIG. 8 is a partially sectional perspective view illustrating a display supporting unit when a display is spread.

FIG. 9 is a view illustrating a display slidably moving along a band.

FIG. 10 is a view illustrating a display rotating on a band.

FIG. 11 is a view illustrating an ear speaker withdrawn from a wristwatch type smart terminal according to an embodiment of the present invention.

FIG. 12 is a view illustrating a user making a phone call using an ear speaker when a wristwatch type smart terminal is worn on the wrist according to an embodiment of the present invention.

FIG. 13 is a partially sectional perspective view illustrating another exemplary display supporting unit when a display is stored in a band.

FIG. 14 is a partially sectional perspective view illustrating another exemplary display supporting unit when a display is spread.

FIGS. 15 and 16 are views illustrating displays moving by another exemplary display supporting unit when the displays are spread.

FIG. 17 is a view illustrating a user making a phone call using a microphone and an ear speaker which are integrally disposed on a display unit of a wristwatch type smart terminal according to an embodiment of the present invention.

FIG. 18 is a view illustrating a user taking a photograph using a camera embedded in a display unit of a wristwatch type smart terminal according to an embodiment of the present invention.

BEST MODE

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "including", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

Hereinafter, an exemplary embodiment of a wristwatch type smart terminal will be described with reference to the accompanying drawings.

As shown in FIGS. 1 and 2, a wristwatch type smart terminal according to an embodiment of the present invention may include a display 110 for displaying information and inputting data and a band 120 for allowing the display 110 to be worn on the wrist.

The band 120 may include a coupling member such that a user can wear or remove the band 120 on or from the wrist, and the coupling of the band 120 may be released by pushing a band release button 124.

The term 'display 110' described hereinafter should be construed as including a touchscreen function of recognizing a specific location and performing a specific function by a stored software when a user touches a character or the specific location shown on a screen.

FIG. 1 is a view illustrating a wristwatch type smart terminal worn on the wrist of a user according to an embodiment of the present invention. As shown in FIG. 1, when the smart terminal 100 is not used, the display 110 may be bent and stored in the band 120, and when the smart terminal 100 is used, the display 110 stored in the band 120 may be spread while rising by a certain height as shown in FIG. 2.

Recently, a flexible display is being developed and used, and the display 110 used in this embodiment may be a flexible display.

When a user pushes a display unlock button 125 of the band 120, the display 110 may automatically rise from a display seating part 121 which is formed into a recessed shape of the band 120, and simultaneously may be spread as shown in FIG. 2. That is, the display 110 may be carried while being worn on the wrist, and may be spread when used.

As shown in FIG. 2, a display fixing protrusion 122 may be formed on the both side ends of the display seating part 121 of the band 120 in which the display 110 is stored. Thus, when the display 110 is inserted into the display seating part 121 of the band 120, the display fixing protrusion 122 may be coupled to the stopping groove 111 of the display 110, and the display 110 may be inserted into and fixed to the display seating part 121 while being bent.

In this state, when a user pushes the display unlock button 125, the display fixing protrusion 122 may be separated from the stopping groove 111 of the display 110, and the display 110 may automatically rise to a certain height by its own elasticity to be spread.

When the use of the smart terminal 100 is finished, a user may press the both side ends of the display 110. In this case, the display 110 may be inserted into the display seating part 121 of the band 120 while being bent, and the stopping groove 111 at the both side ends of the display 110 may be coupled to the display fixing protrusion 122, thereby allowing the display 110 to be fixed in the band 120.

The configuration that the display fixing protrusion 122 is separated from the stopping groove 111 when a user pushes the display unlock button 125 may be formed by a link or solenoid method. Since the various forms of this technology are well known, a detailed description thereof will be omitted herein.

FIG. 3 shows another type of seating part 121 compared to the seating part 121 of the flexible display shown in FIGS. 1 and 2. The display 110, which is a flexible display, may include at least one elastic hinge 112 which is disposed on the undersurface of the display 110 and is bent at a certain angle. The display 110 may be inserted into and fixed to the display seating part 121 while being bent at a certain angle.

Similarly to FIG. 2, the stopping groove 111 may be formed at both side ends of the divided display 110, and the display fixing protrusion 122 may be formed on the display seating part 121. Thus, when the display 110 is inserted into the display seating part 121, the display fixing protrusion 122 may be coupled and fixed to the stopping groove 111 of the divided display 110.

When a user pushes the display unlock button 125, the display fixing protrusion 122 may be separated from the stopping groove 111 of the display 110, and the folded display 110 may be spread by the elasticity of the hinge 112 connecting the divided display 110. Since the elastic hinge 112 is a well-known element, a detailed description thereof will be omitted herein.

As shown in FIG. 9, the display 110 of the wristwatch type smart terminal may slidably move along a guide part 123 disposed on the band 120, and as shown in FIG. 10, may rotate on the band 120.

As shown in FIGS. 1 to 3, the band 120 may include the guide part 123 formed therein. When the display 110 is in the spread state, the display 110 may slidably reciprocate from the upper part of the wrist to the lower part of the wrist along the guide part 123 of the wrist band 120.

As shown in FIG. 4, the display 110 may be coupled to the band 120 through the display supporting unit 130, and the movement and rotation of the display 110 along the guide part 123 may be performed by the display supporting unit 130.

As shown in FIG. 5, the display supporting unit 130 may include a first holder 132 moving along the guide part 123 of the band 120, and a second holder 135 coupled to the first holder 132 and bound to the bottom surface of the display 110.

As described above, the first holder 132 may move along the guide part 123 of the band 120, and for stable sliding movement, may be disposed on a base 131 having a wide area as shown in FIG. 5.

As shown in FIG. 6, the display supporting unit 130 may be configured such that the first holder 132 having a cylindrical shape is inserted into the second holder 135 having a cylindrical shape.

The bottom surface of the first holder 132 may be coupled to the base 131, and the upper surface of the first holder 132 may have a hole (not shown) through which the second holder 135 is inserted and can rise and fall. That is, the second holder 135 may be inserted into the hole, and may rise and fall through the hole inside the first holder 132.

Also, as shown in FIG. 5, a spring 139 may be disposed under the second holder 135, and may elastically support the second holder 135 inside the first holder 132.

As shown in FIG. 6, a fixing stopper 138 may radially protrude from the outer surface of the second holder 135. When the display 110 slides along the band 120 or rotates, the fixing stopper 138 may serve to fix the display 110.

When the display 110 is inserted into and fixed to the display seating part 121 of the band 120, the second holder 135 coupled to the lower part of the display 110 may be inserted into the first holder 132 while being elastically supported by the spring 139 as shown in FIGS. 5 and 6.

When a user pushes the display unlock button 125 of the band 120 to use the smart terminal 100, the display fixing protrusion 122 shown in FIG. 2 and fixing the display 110 may be separated from the stopping groove 111 of the display 110, and the second holder 135 may rise from the first holder by the elasticity of the spring 139, thereby allowing the display 110 to upwardly protrude as shown in FIG. 7.

In this case, as shown in FIGS. 7 and 8, when the second holder 135 rises, the fixing stopper 138 radially formed on the upper side of the outer surface of the second holder 135 may be coupled to insertion grooves 127 which are continuously formed at a certain interval in the left and right inner side surfaces of the guide part 123 on the outer surface of the band 120. Thus, the sliding movement and rotation of the display 110, which is coupled to the second holder 135, along the guide part 123 may be controlled and constrained according to the intention of a user.

In this state, when a user presses the central portion of the display 110, as shown in FIGS. 5 and 6, the second holder 135 may be inserted into the first holder 132, and the fixing stopper 138 radially formed on the outer surface of the second holder 135 may downwardly escape from the insertion groove 127 formed on both inner side surfaces of the guide part 123 in the band 120. Thus, as shown in FIG. 9, a user may slidably move display 110 along the guide part 123 of the band 120, or as shown in FIG. 10, may rotate the display 110 freely.

That is, as shown in FIGS. 9 and 10, a user can move and adjust the display 110 of the smart terminal to a location which is convenient for a user to watch Digital Multimedia Broadcasting (DMB) or movies, and may adjust the display 110 to a location which is convenient for a user to take a photograph.

As described above, a user may push the display 110 to separate the fixing stopper 138 of the display supporting unit 130 from the insertion groove 127 of the guide part, and may adjust the location of the display 110 and then release his/her hold on the display 110. Then, the second holder 135 may rise by elasticity of the spring 139 elastically supporting the second holder 135 inside the first holder 132, and the fixing stopper 138 radially formed on the upper side of the outer surface of the second holder 135 may be inserted into the insertion grooves 127 formed in the left and right inner side surfaces of the guide part of the band 120, allowing the display 110 coupled to the second holder 135 to be fixed.

As described above, the sliding movement and rotation of the display 110 may be constrained by the fixing stopper 138 radially formed on the outer surface of the second holder 135. In this case, since the fixing stopper 138 may be easily broken to constrain the rotation of the display 110 on the ground of the structural feature of the wristwatch type smart terminal which is manufactured into a small size, a separate member for controlling the rotation of the display 110 may be provided to more surely constrain the rotation of the display 110.

As shown in FIGS. 6 and 8, a first disk 133 including a toothed gear 134 downwardly protruding at a certain interval according to the radial shape may be disposed under a disk mounted on the inner edge circumference of the upper cover of the first holder 132 in which the upper hole is formed to allow the second holder 135 to rise and fall. Also, a second disk 136 including a second toothed gear 137 upwardly protruding radially at a certain interval may be disposed on the upper surface of the disk mounted on the lower outer circumference of the second holder 135 that is a counterpart of the first holder 132.

As shown in FIGS. 5 and 6, when a user presses the display 110 to adjust the location of the display 110, the second holder 135 may descend, and thus the fixing stopper 138 may be separated from the insertion groove 127 formed on the left and right inner sides of the guide part 123 of the band 120. Also, the second disk 136 disposed under the second holder 135 may downwardly move, and thus may be separated from the first disk 133 of the first holder 132.

As shown in FIGS. 7 and 8, when a user releases his/her hold on the display 110 after adjusting the location of the display 110, the second holder 135 may rise by elasticity of the spring 139, and thus the fixing stopper 138 of the second holder 135 may be inserted into the corresponding insertion groove 127 formed on the left and right inner sides of the guide part 123 of the band 120. In linkage therewith, the second disk 136 mounted on the lower outer circumference of the second holder 135 may rise, and thus may be coupled to the first disk 133 mounted on the inner edge circumference of the upper cover of the first holder 132.

As described above, when the first disk 133 is coupled to the second disk 136, the first toothed gear 134 downwardly protruding from the undersurface of the first disk 133 may engage with the second toothed gear 137 upwardly protruding from the upper surface of the second disk 136, thereby constraining the display 110 coupled to the second holder 136 from rotating arbitrarily.

Thus, due to the engagement of the first disk 133 of the first holder 132 and the second disk 136 of the second holder 135, the rotation of the display 110 may be surely controlled.

The representative example of the wristwatch type smart terminal may be a smartphone, but the smartphone may be inconvenient to use while being worn on the wrist.

For this, as shown in FIG. 11, a rod storage part 126 may be disposed in the band 120 of the wristwatch type smart terminal to receive the rod 128.

The rod storage part 126 may receive the rod 128, and the rod 128 may include an ear speaker 129 and be configured to have an antenna form such that a rod having a smaller diameter is inserted into a rod having a larger diameter like an antenna. The rod 128 may have a stepped shape like an antenna, and may be adjusted in length.

Since a technology capable of freely adjusting the length by forming the rod using multiple rods like an antenna and thus inserting or withdrawing a rod into or from another adjacent rod is well known, a detailed description thereof will be omitted herein.

When not used, the rod 128 of FIG. 11 may be inserted into the rod storage part 126 of the band 120. When a user makes a phone call, a user may withdraw the rod 128 from the rod storage part 126 of the band 120 as shown in FIG. 11, and may place the ear speaker 129 formed at the end portion of the rod 128 to the ear of a user as shown in FIG. 12.

When a user tries to talk, voice may be delivered to a microphone formed in the display 110 like a typical smartphone, or although not shown, voice may be delivered through a microphone (not shown) formed at the lower part of the band 120 corresponding to the location of the mouth of a user as shown in FIG. 12. Also, the ear speaker 129 formed at the end portion of the rod 128 that is withdrawn may be operated near the ear of the human body to deliver voice of the other party to a user.

The microphone formed in the band 120 and the ear speaker 129 formed at the end portion of the rod 128 may be wiredly connected to an internal circuit of the display 110, or may be connected to the internal circuit of the display 110 through a wireless communication such as Bluetooth.

In another embodiment, an automatic line winder connected to the ear speaker 129 may be disposed in the band 120 to wind an earphone line at the end portion thereof. For a phone call, when the ear speaker 129 is withdrawn and worn on the ear, the earphone line wound inside the band 120 may be unwound. When the phone call is finished and the ear speaker 129 is detached from the ear, the earphone line may be automatically wound inside the band 120.

Since this automatic line winder is a well-known technology, a detailed description thereof will be omitted herein.

As above, in order to use the wristwatch type smart terminal 100, a user may push the display unlock button 125 to spread the display 110, and then may adjust the location of the display 110 by sliding and rotating the display 110 by hand such that a user can use the wristwatch type smart terminal 100 in a comfortable position. However, the display 110 may also be configured to automatically slide and rotate to a location easy for a user to use when a user pushes the display unlock button 125.

To this end, although not shown in the drawing, one side of a tensile force acting member (not shown, e.g., extension spring or rubber band) may be fixed to the base 131 or the display supporting unit 130, and the other side of the tensile force acting member (not shown) may be fixed to any one side of both side ends of the guide part 123.

The configuration of the display supporting unit 130 may be changed while comparing and referring to the drawings of FIGS. 6 and 13. The configuration of the first holder 132, the second holder 135, the fixing stopper 138, the first disk 133, and the second disk 136 may be identical to the configuration of the display supporting unit shown in FIGS. 5 to 8.

As shown in FIG. 13, a first stopper 140 may downwardly protrude from the undersurface of the first disk 133 of the first holder 132, and a second stopper 141 may upwardly protrude from the top surface of the second disk 136 of the second holder 135. Also, as shown in FIG. 14, a spring 139 may be disposed under the second holder 135.

The first stopper 140 of the first disk 133 and the second stopper 141 of the second disk 136 may be spaced at an angular displacement of about 45 degrees based on the axis of the second holder 135.

When the display 110 is inserted into the display seating part 121 of the band 120, the display supporting unit 130 may become a state of FIG. 13.

In this state, a tensile force may act on the display supporting unit 130 by the tensile force acting member (not shown).

Also, the spring 139 elastically supporting the second holder 135 may serve as both compression spring and torsion spring. As shown in FIG. 13, when the first disk 133 of the first holder 132 and the second disk 136 of the second holder 135 are separated, the spring 139 may be compressed. Furthermore, when the first stopper 140 of the first disk 133 and the second stopper 141 of the second disk 136 are in a separated state, a torsion may be applied to the spring 139.

When a user pushes the display unlock button 125, the display fixing protrusion 122 of the display seating part 121 may be separated, and the display 110 may be automatically spread. At the same time, the display supporting unit 130 may slide along the guide part 123 by the tensile force acting member.

Also, as shown in FIG. 14, the second holder 135 may upwardly protrude by the elasticity of the spring 139, and the torsion applied to the spring 139 may be released, allowing the spring 139 to rotate the second holder 135. Thus, as shown in FIG. 14, the first stopper 140 of the first disk 133 and the second stopper 141 of the second disk 136 may be coupled through sliding rotation movement, thereby achieving a balance of forces by a mutual backward movement and thus stopping the rotation of the second holder 135.

Due to the achievement of the chain and continuous movement of the display supporting unit 130 by the tensile force acting member as above, as shown in FIG. 15, the display 110 may slide at an angular displacement of about 45 degrees in a downward direction of the wrist (downward direction of the wrist when viewed from a user) by the sliding and the rotation of the second holder 135 by the torsion of the spring 139, and simultaneously, may counterclockwise rotate about 45 degrees on the display supporting unit 130.

The location of the display 110 as shown in FIG. 15 may correspond to a location that is comfortable for a user to perform Internet search or watch movies or DMB while putting his/her hand on a desk.

Also, the location of the display 110 in FIG. 15 may enable a user to conveniently take a photograph using a camera mounted in the rear surface of the display 110 by obliquely raising his/her hand while wearing the smart terminal 100 on the wrist as shown in FIG. 18.

In this case, a camera lens of the display 110 may be obliquely disposed at an angle of about 45 degrees such that the camera lens of the display 110 can face the front side even when a user obliquely raises his/her arm at an angle of about 45 degrees without the need to orthogonally raise the arm.

Also, the display 110 may also be configured to slide in the opposite direction of FIG. 15. The display 110 may slide at an angular displacement of about 45 degrees in an upward direction of the wrist (upward direction of the wrist when viewed from a user) as shown in FIG. 16 by the tensile force acting member, and at that location, may clockwise rotate about 45 degrees on the display supporting unit 130.

At that location, a user can take a phone call using a microphone and an ear speaker mounted in the display 110 worn on the wrist like a smartphone without a separate microphone or ear speaker.

That is, when the display 110 is moved at the location as shown in FIG. 16 and a user adheres the wrist closely to the cheek, the ear speaker of the display 110 may be located near the ear of a user, and the microphone of the display 110 may be located near the mouth of a user, thereby making it convenient to take a phone call.

The wristwatch type smart terminal configured as above can be conveniently worn on the wrist of a user to be carried without a pocket or a bag, and may independently perform all functions of the smartphone without being dependent on the smartphone.

Furthermore, the wristwatch type smart terminal can display a large amount of information on a wide display screen, and can provide a function such as watching movie or DMB. In addition, it is very convenient to carry and use the wristwatch type smart terminal by storing the display screen in a wrist band while being worn on the wrist.

The technical spirits of the present invention have been described through some embodiments above.

It will be clear that those skilled in the art can variously change or modify the above-mentioned embodiments from the described details of the present invention. Also, although not described or shown in the drawing, it will be clear to those skilled in the art that the present invention can be modified into various forms including the technical spirit of the present invention from the described details of the present invention, which still belong to the scope of the present invention. The above embodiments described with reference to the accompanying drawings have been described in order to explain the present invention, and the scope of the present invention will not be limited to these embodiments.

The invention claimed is:

1. A wristwatch type smart terminal, comprising:
    a band for wearing on a wrist of a user;
    a display coupled to the band,
    wherein the display is in a first state in which the display is bent or folded such that the display is inserted into the band or is in a second state in which the display is flat and unfolded, and the display is configured to be switched between the first state and the second state;
    a guide part longitudinally formed in an outer surface of the band, wherein the guide part guides a sliding movement of the display; and
    a display supporting unit having an upper part coupled to an undersurface of the display and a lower part coupled to a base disposed inside the guide part of the band,
    wherein the base is configured to move along the guide part of the band to move the display in the second state.

2. The wristwatch type smart terminal of claim 1,
    wherein the display is a flexible display having an elasticity, and
    the display is configured to be switched between the first state and the second state by the elasticity of the flexible display.

3. The wristwatch type smart terminal of claim 1, further comprising,
    at least one elastic hinge having an elasticity and disposed on an undersurface of the display,
    wherein the display is inserted into the band while being bent at an angle through the at least one elastic hinge, and
    the display is configured to be switched between the first state and the second state by the elasticity of the at least one elastic hinge.

4. The wristwatch type smart terminal of claim 2, further comprising:
    a fixing member,
    wherein the display supporting unit supports the display, the band comprises a display seating part having a recessed shape, and the display is inserted into and fixed to the display seating part by the fixing member while the display is bent in the same curvature as a curvature of the band and remains in the first state.

5. The wristwatch type smart terminal of claim 4,
    wherein the fixing member comprises:
    a display fixing protrusion inwardly protruding from both side ends of the display seating part;
    a stopping groove formed on the both side ends of the display and receiving the display fixing protrusion; and
    a display unlock button that separates the display fixing protrusion from the stopping groove.

6. The wristwatch type smart terminal of claim 3, further comprising:
    a fixing member,
    wherein the band comprises a display seating part having a recessed shape, and
    the display is inserted into and fixed to the display seating part by the fixing member while the display is bent at an angle and remains in the first state.

7. The wristwatch type smart terminal of claim 6,
    wherein the fixing member comprises:
    a display fixing protrusion inwardly protruding from both side ends of the display seating part;
    a stopping groove formed on the both side ends of the display and receiving the display fixing protrusion; and
    a display unlock button that separates the display fixing protrusion from the stopping groove.

8. The wristwatch type smart terminal of claim 1,
    wherein the display supporting unit is coupled to the base and rotatable with respect to the base such that the display in the second state is at an angle with respect to the band.

9. The wristwatch type smart terminal of claim 8,
    wherein the display supporting unit further comprises:
    a first holder having a cylindrical shape, having a lower portion coupled to the base, and having a hole formed in an upper surface of the first holder;
    a second holder having an upper end coupled to the display, wherein the second holder is inserted into the first holder to rise and fall through the hole; and
    a spring disposed under the second holder and supported by the first holder, wherein the spring supports elastically the second holder,
    wherein, when the display is switched from the first state to the second state, the display is protruded upward with respect to the band as the second holder is risen from the first holder by an elasticity of the spring.

10. The wristwatch type smart terminal of claim 9, further comprising
    a fixing stopper radially protruding at a certain interval from an outer surface of the second holder; and
    an insertion groove continuously formed in an inner surface of the guide part of the band at a certain interval,
    wherein, when the second holder rises, the fixing stopper of the second holder is inserted into the insertion groove to constrain a movement of the display coupled to the upper end of the second holder, and wherein, when the second holder falls, the fixing stopper of the second holder is separated from the insertion groove to release the movement constraint of the display such that the display slides along the guide part of the band or rotates.

11. The wristwatch type smart terminal of claim 9, wherein a lower end of the spring is coupled to the first holder or the base and an upper end of the spring is coupled to the second holder such that, when the second holder rises, the second holder rises while rotating at a certain angle by a torsion of the spring and thus allows the display coupled to the upper end of the second holder to simultaneously rotate at the certain angle.

12. The wristwatch type smart terminal of claim 11, further comprising:
a first disk comprising a first stopper downwardly protruding from a lower surface of a disk mounted on an edge circumference inside an upper cover of the first holder; and
a second disk comprising a second stopper upwardly protruding from an upper surface of a disk mounted on a lower outer circumference of the second holder,
wherein, when the second holder rises, the second holder rises while rotating by the torsion of the spring and thus constrains a rotation movement of the display at an angular displacement due to coupling by a sliding rotation movement of the first stopper of the first disk and the second stopper of the second disk.

13. The wristwatch type smart terminal of claim 11, further comprising
a tensile force acting member having one side coupled to the base or the display supporting unit and the other side fixed to one of side ends of the guide part such that, when the second holder rises, the display supporting unit is configured to slide along the guide part.

14. The wristwatch type smart terminal of claim 1, wherein the band comprises:
a rod storage part; and
a rod having an ear speaker disposed at an end thereof and being stored in the rod storage part,
wherein the rod is formed of multiple rods having different inner diameters such that the rod is telescopically adjustable in length, and the rod is capable of being withdrawn from the rod storage part such that the ear speaker operates near an ear of a human body when a user takes a phone call.

15. A wristwatch type smart terminal comprising:
a band for wearing on a wrist of a user, wherein the band comprises a display seating part having a recessed shape;
a display coupled to the band;
a guide part longitudinally formed in an outer surface of the band and configured to guide a sliding movement of the display;
a display supporting unit having an upper part coupled to an undersurface of the display and a lower part coupled to a base inside the band to support the display; and
a fixing member,
wherein the display is in a first state in which the display is bent or folded such that the display is inserted into and fixed to the display seating part by the fixing member, or in a second state in which the display is flat and unfolded,
the display is configured to slide along the guide part in the second state, and
the display is configured to be switched between the first state and the second state.

16. The wristwatch type smart terminal of claim 15, wherein the display supporting unit is coupled to the base and rotatable with respect to the base such that the display in the second state is at an angle with respect to the band.

17. The wristwatch type smart terminal of claim 15, wherein the fixing member comprises:
a display fixing protrusion inwardly protruding from both side ends of the display seating part;
a stopping groove formed on the both side ends of the display and receiving the display fixing protrusion; and
a display unlock button that separates the display fixing protrusion from the stopping groove.

18. The wristwatch type smart terminal of claim 15, wherein the display is a flexible display and the flexible display is inserted into and fixed to the display seating part by the fixing member while being bent in the same curvature as a curvature of the band such that the flexible display remains in the first state, and
wherein, when the fixing member is released, the flexible display is switched to the second state by an elasticity of the flexible display.

19. The wristwatch type smart terminal of claim 15, further comprising,
at least one elastic hinge having an elasticity and disposed on an undersurface of the display,
wherein the display is inserted into the band while being bent at an angle through the at least one elastic hinge, and
the display is configured to be switched between the first state and the second state by the elasticity of the at least one elastic hinge.

* * * * *